United States Patent [19]

Lybecker

[11] Patent Number: 4,850,094

[45] Date of Patent: Jul. 25, 1989

[54] METHOD FOR MOUNTING GATE OPENER

[75] Inventor: Robert W. Lybecker, Kerrville, Tex.

[73] Assignee: Bomar Corporation, Center Point, Tex.

[21] Appl. No.: 148,780

[22] Filed: Jan. 26, 1988

[51] Int. Cl.[4] .............................................. B23P 11/00

[52] U.S. Cl. ..................................... 29/434; 29/525.1; 49/340; 49/358

[58] Field of Search ................. 29/434, 525.1; 49/340, 49/344, 358; 248/674

[56] References Cited

U.S. PATENT DOCUMENTS

| | | | |
|---|---|---|---|
| 2,283,577 | 5/1942 | Roby | 49/265 |
| 2,592,891 | 4/1952 | Hall | 49/340 |
| 3,202,414 | 8/1965 | Simmons et al. | 49/340 X |
| 3,500,585 | 3/1970 | Vollmar | 49/280 |
| 3,645,042 | 2/1972 | Bolli | 49/340 X |
| 3,936,977 | 2/1976 | Runft et al. | 49/340 X |
| 4,231,190 | 11/1980 | Tieben | 49/25 |
| 4,330,958 | 5/1982 | Richmond | 49/340 X |
| 4,416,085 | 11/1983 | Lybecker et al. | 49/340 |
| 4,429,491 | 2/1984 | Bruns | 49/340 |
| 4,534,278 | 8/1985 | Spilde | 49/340 X |
| 4,638,597 | 1/1987 | Lybecker | 49/340 |
| 4,735,018 | 4/1988 | Duncan et al. | 49/340 |
| 4,796,385 | 1/1989 | Tyler | 49/340 X |

FOREIGN PATENT DOCUMENTS

| | | |
|---|---|---|
| 2418856 | 3/1978 | France . |
| 7600864 | 1/1976 | Netherlands . |

*Primary Examiner*—Mark Rosenbaum
*Assistant Examiner*—Frances Chin
*Attorney, Agent, or Firm*—Richard J. Smith

[57] ABSTRACT

A method and apparatus for mounting a linear structure actuator gate opener to a gate and fence. The method comprises the steps of selectively positioning a gate bracket so that the gate bracket is at a predetermined distance relative to a hinge member intermediate to the gate and fence, securing the gate bracket to the gate in the selected position for the gate bracket, pivotally mounting a linear actuator to the first bracket, pivoting the linear actuator so that the actuator is at a predetermined distance relative to the hinge member, pivotally mounting the actuator to a fence bracket, and securing the fence bracket to the fence or gate post to which the gate is hingedly connected. A gate bracket and fence bracket are also disclosed.

6 Claims, 3 Drawing Sheets

METHOD FOR MOUNTING GATE OPENER

BACKGROUND OF THE INVENTION

The present invention relates generally to a method and apparatus for mounting a gate opener. More particularly, the present invention relates to a method and apparatus for mounting a linear actuator gate opener to a gate and post.

The utilization of a linear actuator to effectuate the opening and closing of a gate is well known in the art. Mounting a linear actuator gate opener to a gate and an adjacent fence or gate post is also known in the art. However, the proper mounting of a linear actuator gate opener to a gate and an adjacent fence or gate post requires the accurate determination of the points at which each end of the actuator should pivot in order to achieve a desired degree of opening of the gate. The proper location of the actuator pivot points is generally a function of the stroke of the actuator. If the pivot points are not accurately positioned, the gate will not open to the desired degree without the generally complicated step of adjusting the actuator stroke. The determination of the proper location of the actuator pivot points has heretofore complicated the mounting of a linear actuator.

SUMMARY OF THE INVENTION

Accordingly, the present invention provides a method and apparatus for effectively and readily mounting a linear actuator gate opener which significantly reduces the complexity and time consumption heretofore associated with the mounting of a linear actuator gate opener.

The method for mounting a linear actuator gate opener comprises the steps of selectively positioning a gate bracket so that the gate bracket is at a predetermined position relative to the gate hinge, securing the gate bracket to the gate in the selected position for the gate bracket, pivotally mounting or connecting one end of the actuator to the gate bracket, pivoting the actuator to a predetermined position relative to the gate hinge, pivotally mounting or connecting the opposite end of the actuator to a fence bracket, and securing the fence bracket to a fence or gate post adjacent to the gate. The predetermined positions of the gate bracket and actuator relative to the gate hinge are determined by the actuator stroke and the desired degree of opening of the gate.

The gate bracket comprises an upper plate portion, a lower plate portion, and an intermediate plate portion. A pivot pin is connected to the lower plate portion substantially perpendicular thereto. The fence bracket comprises a first plate portion and a second plate portion substantially perpendicular to the first plate portion. A first pivot pin is connected to the first plate portion substantially perpendicular thereto and a second pivot pin is connected to the second plate portion substantially perpendicular thereto. An actuator band clamp is provided for pivotally mounting or connecting one end of the actuator to the gate bracket or fence bracket.

DETAILED DESCRIPTION OF THE PREFERRED EMBODIMENT

Figure 1:
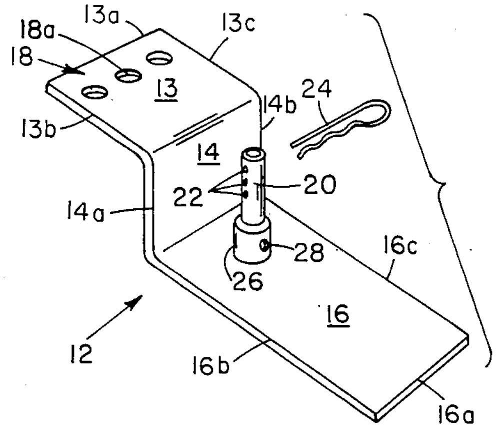
FIG. 1 is a perspective view of the preferred embodiment of the gate bracket of the present invention.
Figure 11:
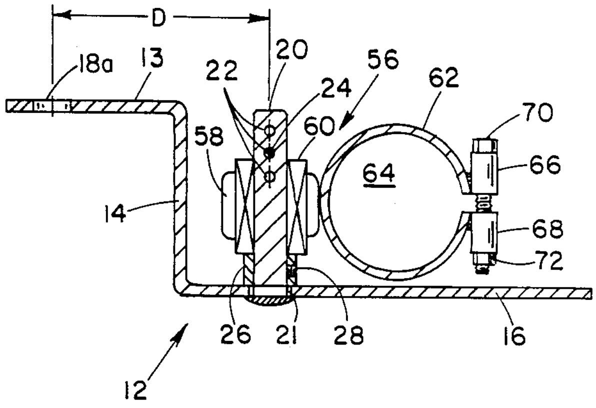
FIG. 11 is a cross-sectional side view of the gate bracket and actuator band clamp taken along section lines 11—11 of FIG.

Referring to FIG. 1 and FIG. 11, the gate bracket of the present invention is identified by the number 12. Gate bracket 12 comprises a unitary piece of steel having an upper plate portion 13, a lower plate portion 16, and an intermediate plate portion 14. Plate portion 14 is substantially perpendicular to plate portion 13 and plate portion 16. Plate portion 13 has a plurality of holes 18 therethrough, including an intermediate hole 18*a*. An upstanding pivot pin 20 extends through a hole 21 in plate portion 16 and is welded to plate portion 16. Pin 20 is substantially perpendicular to plate portion 16. Pin 20 has a plurality of passages 22 therethrough substantially transverse to the longitudinal axis of pin 20. Each of the passages 22 is adapted to receive therethrough the straight side of a locking key 24. A shaft collar 26 may be positioned about pin 20 and collar 26 may be secured to pin 20 by a set screw 28 which abuts against pin 20.

Figure 3:
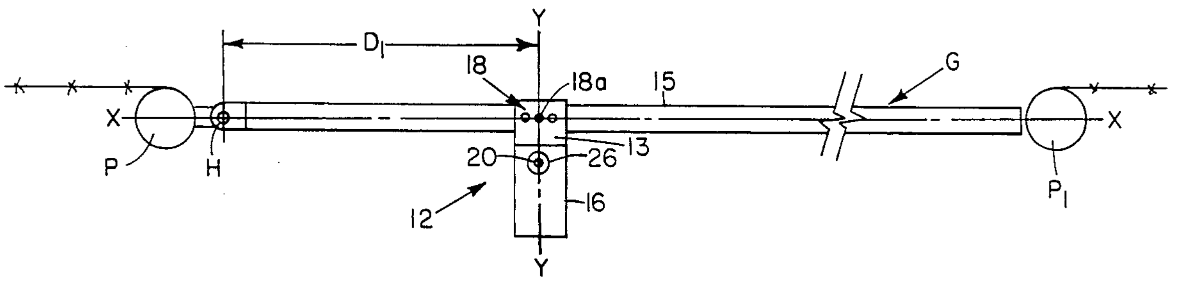
FIG. 3 is a top plan view illustrating the positioning of the gate bracket of the present invention.

Referring to FIG. 3 and FIG. 11, it is to be understood that the centers of holes 18 are preferably aligned and that the center of hole 18*a* and the center of hole 21 are aligned with axis Y—Y. Further, the center of pin 20 is also aligned with axis Y—Y. Axis Y—Y may be considered the center line of bracket 12. It is also to be understood that the center of hole 21 and the center of pin 20 are at a predetermined horizontal distance D from the center of hole 18*a*.

Figure 2:
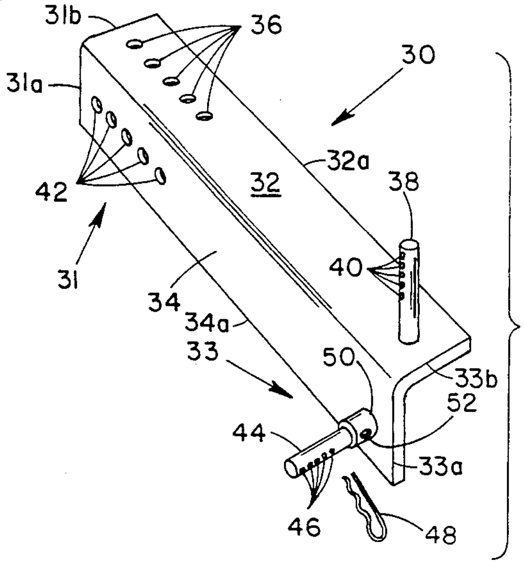
FIG. 2 is a perspective view of the preferred embodiment of the fence bracket or gate post bracket of the present invention.

Referring to FIG. 2, the fence bracket or gate post bracket of the present invention is identified by the number 30. Gate post bracket 30 comprises a unitary, right angle piece of steel having a first side or plate portion 32 and a second side or plate portion 34. Plate portion 34 is substantially perpendicular to plate portion 32. Plate portion 32 has a plurality of holes 36 therethrough. An upstanding pivot pin 38 extends through a hole (not shown) in plate portion 32 and is welded to plate portion 32. Pin 38 is substantially perpendicular to plate portion 32. Pin 38 has a plurality of passages 40 therethrough substantially transverse to the longitudinal axis of pin 38. Plate portion 34 has a plurality of holes 42 therethrough. An upstanding pivot pin 44 extends through a hole (not shown) in plate portion 34 and is welded to plate portion 34. Pin 44 is substantially perpendicular to plate portion 34. Pin 44 has a plurality of passages 46 therethrough substantially transverse to the longitudinal axis of pin 44. Holes 36 and 42 extend through a first end 31 of fence bracket 30 and pins 38 and 44 are connected to a second end 33 of fence bracket 30 opposite first end 31. Further, the longitudinal axis of pin 38 is substantially perpendicular to the longitudinal axis of pin 44. Referring again to FIG. 2, each of the passages 40 and 46 is adapted to receive therethrough the straight side of a locking key 48. Further, a shaft collar 50 may be positioned about pin 38 or pin 44 and may be secured to the respective pin 38 or 44 by a set screw 52 which abuts against the respective pin 38 or 44.

Figure 6:
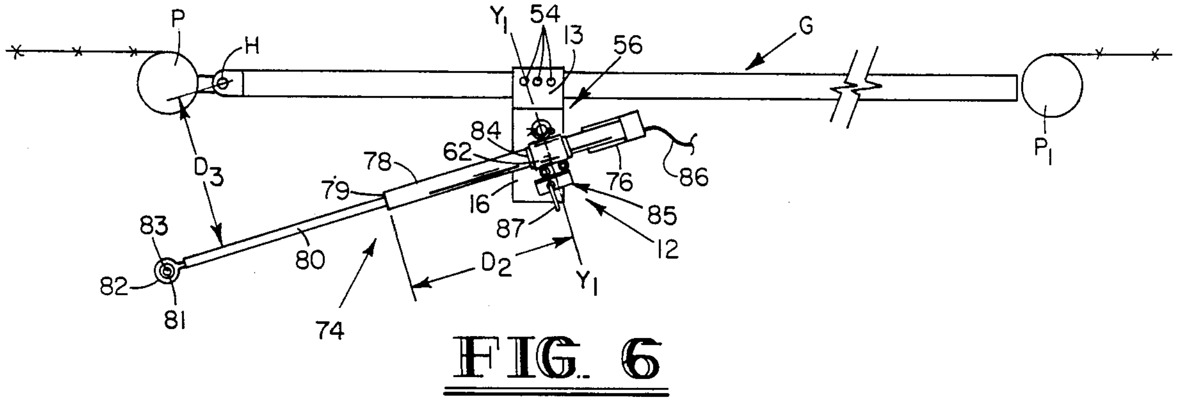
FIG. 6 is a top plan view illustrating the securement of a linear actuator to the gate bracket of the present invention.

Referring to FIGS. 3-4, 6, and 8-10, it is to be understood that the letter G identifies a gate. Further, gate G is hingedly connected to an adjacent fence post or gate post which is identified by the letter P. Post P may be considered part of the fence to which gate G is connected. The letter H identifies the uppermost one of a plurality of hinge pins intermediate to gate G and fence post P by which gate G is connected to fence post P. As illustrated in FIG. 3, the center of gate G and the center of hinge pin H are aligned with axis X—X. Axis X—X may be considered the center line of gate G. Finally, when gate G is in the "closed" position, as illustrated in FIG. 3 and FIG. 6, gate G extends between post P and an adjacent fence post or gate post $P_1$.

Referring again to FIG. 3 and FIG. 4, the method for mounting a linear actuator gate opener will be described in greater detail. Plate portion 13 is preferably positioned atop the uppermost bar 15 of gate G so that the center of hole 18*a* is aligned with axis X—X. That is, plate portion 13 is preferably positioned atop bar 15 so that the center of hole 18*a* and the center of hinge pin H are in substantially the same vertical plane. Further, plate portion 13 is preferably positioned atop the uppermost bar 15 of gate G such that the shortest horizontal distance between a first imaginary vertical plane and a second imaginary vertical plane is a predetermined horizontal distance $D_1$. The first imaginary vertical plane contains axis Y—Y and the centers of hole 18*a*, hole 21, and pin 20. The second imaginary vertical plane passes through the center of hinge pin H parallel to the first imaginary vertical plane. The predetermined distance $D_1$ is preferably measured and marked on bar 15 prior to the positioning of bracket 12. Further, intermediate hole 18*a* may be utilized for positioning bracket 12 atop bar 15 at the predetermined distance $D_1$ by measuring distance $D_1$, marking the top of bar 15 at the distance $D_1$, and aligning the center of hole 18*a* with the mark identifying distance $D_1$. Finally, plate portion 13 is positioned atop bar 15 so that plate portion 16 extends outward from gate G substantially perpendicular to gate G. That is, plate portion 13 is positioned atop bar 15 so that plate portion 16 is at an angle of approximately ninety (90) degrees with respect to an imaginary vertical plane which extends through axis X—X. Plate portion 16 may be so positioned relative to gate G by aligning the centers of holes 18 with axis X—X. A square may also be utilized for properly positioning plate portion 16 relative to gate G.

Figure 4:
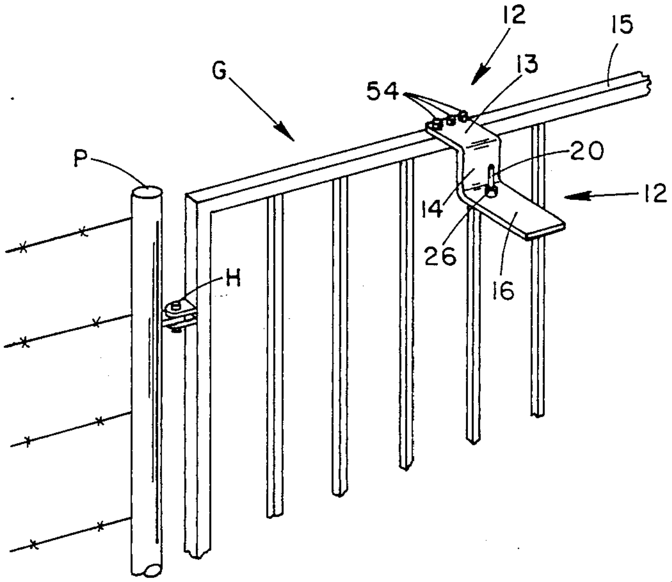
FIG. 4 is a perspective view illustrating the preferred embodiment of the gate bracket of the present invention secured to a gate.

It is to be understood that when bracket 12 and pin 20 are properly positioned or located, as illustrated in FIG. 3 and described hereinabove, axis Y—Y will be substantially perpendicular to axis X—X and axis Y—Y and axis X—X will intersect at approximately the center of hole 18*a*. Further, bracket 12 is thereafter secured or connected to gate G, in the selected position illustrated in FIG. 3 and described hereinabove, by a plurality of bolts 54, as illustrated in FIG. 4. Each of the bolts 54 may be inserted through one of the holes 18 and secured to the uppermost bar 15 in a conventional manner. Alternatively, bracket 12 may be secured or connected to gate G, in the selected position illustrated in FIG. 3 and described hereinabove, by welding plate portion 13 to the upppermost bar 15 of gate G. When bracket 12 is properly positioned and secured to gate G, the center of pivot pin 20 is predetermined horizontal distance D from the center of gate G.

Figure 5:
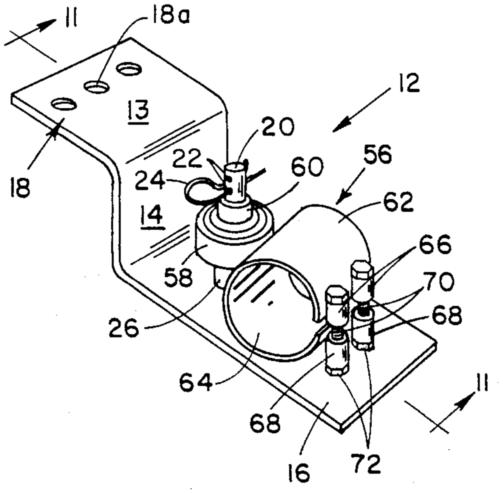
FIG. 5 is a perspective view illustrating the securement of an actuator band clamp to the gate bracket of the present invention.

Referring to FIG. 5 and FIG. 11, an actuator pivot bracket or band clamp 56 is thereafter pivotally mounted or connected to bracket 12. Bracket 56 includes a bushing 58 having a passage therethrough and a copper bearing 60 within the bushing passage. Bearing 60 has a passage therethrough which is adapted to receive pin 20 therethrough. Bushing 58 is welded to an arcuate or curved sleeve 62 having a passage 64 therethrough. A pair of hollow bushings 66 are welded or otherwise connected to the uppermost end of sleeve 62 and a pair of hollow bushings 68 are welded or otherwise connected to the lowermost end of sleeve 62. Each of the upper bushings 66 is aligned with one of the lower bushings 68. A bolt 70 extends through each pair of aligned bushings 66 and 68 and a nut 72 is threaded onto each bolt 70.

Figure 7:
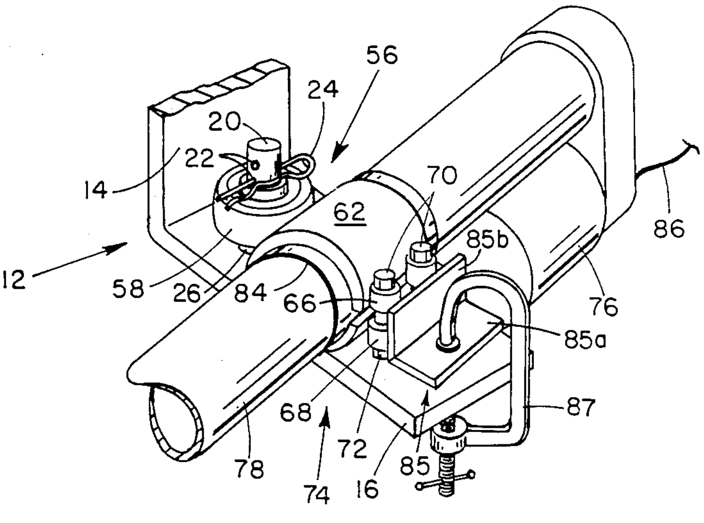
FIG. 7 is a perspective cut-away view illustrating the temporary securement of a linear actuator in a predetermined position with angle iron and a C-clamp.
Figure 8:
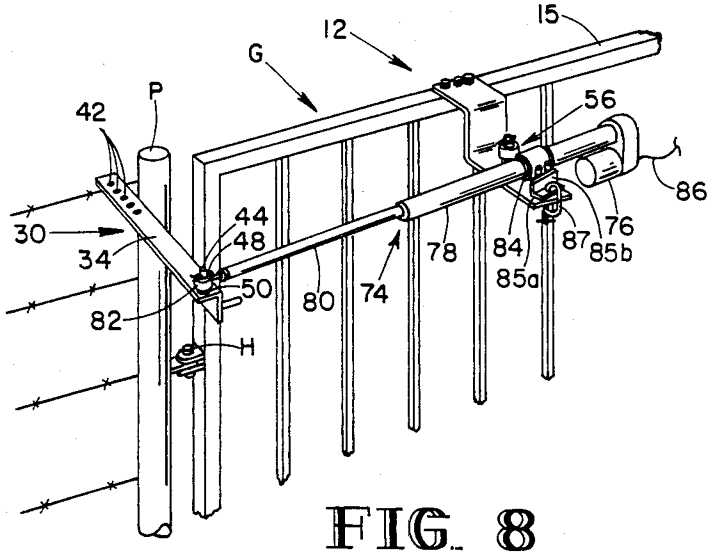
FIG. 8 is a perspective view illustrating the securement of the fence bracket or gate post bracket of the present invention.

Referring to FIG. 6, FIG. 7, and FIG. 8, sleeve 62, bushings 66 and 68, bolts 70, and nuts 72 define a clamp for securing a linear actuator 74 to bracket 56. Actuator 74 is a conventional electromechanical actuator similar to the actuator disclosed in applicant's U.S. Pat. No. 4,638,597. The disclosure of U.S. Pat. No. 4,638,597 is hereby incorporated herein by reference. Actuator 74 comprises a motor 76, a barrel 78, and a shaft 80 having an eye bolt 82 connected thereto. A power cord 86 is connected to motor 76. Eye bolt 82 is preferably threaded into the forward end of shaft 80. Eye bolt 82 preferably has a swivel bearing 81 therein and bearing 81 preferably has a passage 83 therethrough. Eye bolt 82 is on the forward end of actuator 74 and motor 76 is on the rearward end of actuator 74. Actuator 74 is secured or connected to bracket 56 by inserting the forward end of actuator 74 through bracket passage 64 until barrel 78 is received within passage 64. A sleeve or spacer 84 is preferably glued to barrel 78 and positioned about barrel 78 at the position where band clamp 56 is to be secured to actuator 74. Sleeve 62 is thereafter tightened against spacer 84 by tightening or further threading each nut 72 onto its respective bolt 70.

Referring to FIG. 6, the center of spacer 84 is aligned with an axis $Y_1$—$Y_1$ which is perpendicular to the longitudinal axis of barrel 78. Further, when actuator 74 is properly connected to band clamp 56 and band clamp 56 is properly connected to bracket 12, the center of sleeve 62 and the center of pin 20 are also aligned with axis $Y_1$13 $Y_1$. Finally, when actuator 74 is properly connected to band clamp 56 and band clamp 56 is properly connected to bracket 12, the shortest horizontal distance between a third imaginary vertical plane and a fourth imaginary vertical plane is a predetermined horizontal distance $D_2$. The third imaginary vertical plane contains axis $Y_1$13 $Y_1$ and the centers of spacer 84, sleeve 62, and pin 20. The fourth imaginary vertical plane is flush with the forward edge 79 of barrel 78 and parallel to the third imaginary vertical plane.

It is to be understood that a linear actuator 74 may be secured to bracket 56 before or after the mounting or connecting of bracket 56 to bracket 12. It is also to be understood that bracket 56 is pivotally mounted or connected to bracket 12 by placing bushing 58 over pin 20 so that bushing 58 rests atop or is supported by shaft collar 26 and pin 20 extends through the passage in bearing 60. Key 24 may thereafter be removeably inserted through one of the passages 22 above bearing 60 to lock or secure bracket 56 to bracket 12. It is also to be understood that bracket 56 permits the pivotal mounting or connection of actuator 74 to bracket 12.

Once the actuator 74 has been properly secured to bracket 56 and bracket 56 has been properly mounted to bracket 12 so that the rearward end of actuator 74 is pivotally mounted to bracket 12, gate G is held or blocked in the "closed" position with the actuator 74 substantially level and the actuator shaft 80 fully extended. As illustrated in FIG. 6, actuator 74 is thereafter pivoted about pin 20 until the shortest horizontal distance between a fifth imaginary vertical plane and the edge of shaft 80 closest to the fifth imaginary vertical plane is a predetermined horizontal distance $D_3$. The fifth imaginary vertical plane passes through the center of hinge pin H parallel to the longitudinal axis of shaft 80. The actuator 74 may be properly pivoted to its predetermined position relative to gate hinge pin H by measuring $D_3$ with a square or other instrument. Further, the proper positioning of actuator 74, as illustrated in FIG. 6, thereby determines the proper position or location of bracket 30 and pin 44.

Figure 9:
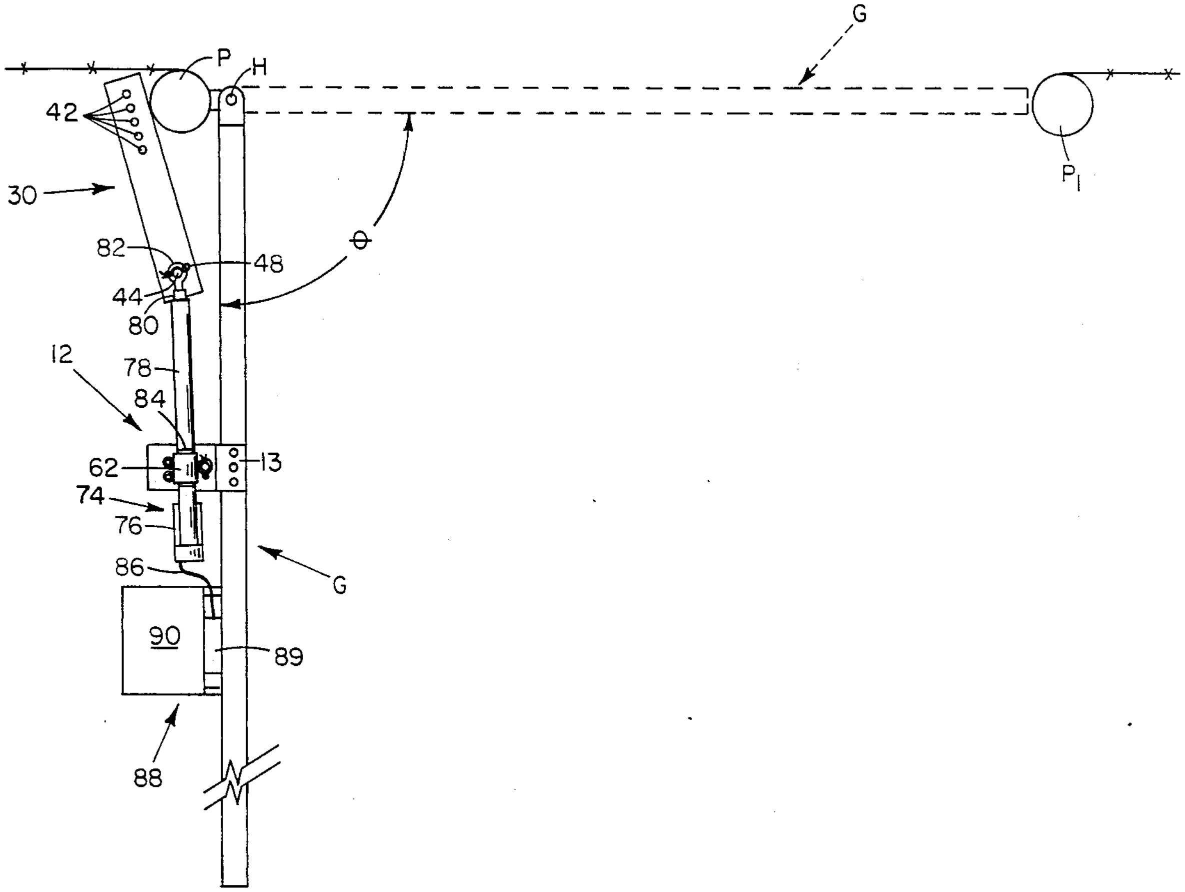
FIG. 9 is a top plan view illustrating the operation of a linear actuator gate opener mounted in accordance with the present invention.

As illustrated in FIGS. 6–8, a unitary, right angle piece of angle iron 85 is thereafter removably secured to plate portion 16 by a C-clamp 87 so that angle iron 85 is in abutting relation to bracket 56, thereby prohibiting pivotal travel of actuator 74. Angle iron 85 comprises a substantially horizontal plate portion 85a and a substantially vertical portion 85b substantially perpendicular to horizontal portion 85a. Angle iron 85 and C-clamp 87 are removably secured to bracket 12 by the gripping action of C-clamp 87 against plate portion 85a and the underside of plate portion 16 and angle iron 85 is positioned atop plate portion 16 so that plate portion 85b abuts against bushings 68. Actuator 74 is thereby temporarily secured in its predetermined position relative to hinge pin H. The pin 44 on gate post bracket 30 is thereafter inserted through the passage 83 in swivel bearing 81 so that bearing 81 rests atop collar 50. The forward end of actuator 74 is thereby pivotally mounted or connected to bracket 30 and bracket 30 and pin 44 are thereby properly positioned or located. Key 48 may thereafter be removably inserted through one of the passages 46 above bearing 81 to lock or secure actuator 74 to bracket 30. As further illustrated in FIG. 8, the end 31 of bracket 30 is thereafter secured or connected to gate post P by welding or bolting plate portion 32 to post P. Plate portion 32 may be bolted to post P by inserting a plurality of bolts (not shown) through passages 36 and securing the bolts to post P in a conventional manner. The angle iron 85 and C-clamp 87 are thereafter removed from bracket Once the linear actuator 74 has been mounted to gate G and post P, as described hereinabove, a power system or unit 88 is clamped or otherwise appropriately connected to gate G, as illustrated in FIG. 9. The actuator motor 76 is thereafter connected to power system or unit 88 by power cord 86, as further illustrated in FIG. 9. The power system 88 is preferably a solar powered unit, such as the system disclosed in U.S. Pat. No. 4,416,085. The disclosure of U.S. Pat. No. 4,416,085 is hereby incorporated herein by reference. The power system 88 comprises a battery pack 89, to which motor 76 is connected by cord 86, and a solar panel 90. The power system 88 is preferably activated by a remote hand held radio transmitter unit (not shown). The power system 88 is preferably clamped or otherwise appropriately connected to gate G so that the uppermost surface of solar panel 90 is level with the top of bar 15. It is also preferable to have the actuator 74 and power system 88 on the same side of the gate G and preferably on the "inside" or protected property side of gate G.

As further illustrated in FIG. 9, the activation of the gate opener apparatus when gate G is in the "closed" position will cause shaft 80 to be withdrawn into barrel 78, thereby causing actuator 74 to pivot about pins 20 and 44 and gate G to pivot about hinge pin H to the "open" position. The activation of the gate opener apparatus when gate G is in the "open" position will cause shaft 80 to extend from barrel 78, thereby causing actuator 74 to pivot about pins 20 and 44 and gate G to pivot about hinge pin H to the "closed" position. It is to be understood that the hidden lines in FIG. 9 illustrate gate G in the "closed" position. Further, the desired degree of opening of gate G or angle of pivot of gate G between the "closed" position and the "open" position is a desired angle $\theta$. Finally, it is to be understood that the angle $\theta$ illustrated in FIG. 9 is ninety (90) degrees and that the angle $\theta$ will normally be ninety (90) degrees.

It is to be understood that FIG. 5 and FIG. 6 illustrate gate G in the "closed" position and actuator 74 in the extended position. Further, FIG. 9 illustrates gate G in the "open" position and actuator 74 in the retracted position. It is to be understood that distance D is preferably five and one-eighths inches ($5\frac{1}{8}''$). Further, for a desired degree of opening ($\theta$) of approximately ninety (90) degrees and an actuator 74 having a stroke of approximately seventeen and one-half inches ($17\frac{1}{2}''$) and a distance $D_2$ of approximately sixteen and one-half inches ($16\frac{1}{2}''$), $D_1$ is approximately thirty one inches ($31''$) and $D_3$ is approximately nine and three fourths inches ($9\frac{3}{4}''$). It is also to be understood that the stroke of actuator 74 is the difference between the extended length of actuator 74, as illustrated in FIG. 6, and the retracted length of actuator 74, as illustrated in FIG. 9. For a stroke of seventeen and one-half inches ($17\frac{1}{2}''$), the extended length between the forward edge 79 of barrel 78 and the center of eyebolt 82 may be approximately twenty-one and three-eighths inches ($21\frac{3}{8}''$) and the retracted length between the forward edge 79 of barrel 78 and the center of eye bolt 82 may be approximately three and seven-eighths inches ($3\frac{7}{8}''$).

It is to be understood that for a given actuator stroke, D, $D_1$, and $D_2$, the angle $\theta$ may be varied by simply varying the distance $D_3$. The following chart illustrates the relationship between $D_3$ and the angle $\theta$ for the actuator stroke, D, $D_1$, and $D_2$ recited hereinabove.

| $D_3$ (in inches) | $\theta$ (in degrees) |
|---|---|
| 9 | 98 |

-continued

| $D_3$ (in inches) | $\theta$ (in degrees) |
|---|---|
| 9-$\frac{1}{4}$ | 95 |
| 9-$\frac{1}{2}$ | 92 |
| 9-$\frac{3}{4}$ | 90 |
| 10 | 86 |
| 10-$\frac{1}{4}$ | 84 |
| 10-$\frac{1}{2}$ | 82 |
| 10-$\frac{3}{4}$ | 79 |

It is to be understood that each angle $\theta$ in the chart hereinabove is approximate, plus or minus one (1) degree.

Referring again to FIG. 1, it is to be understood that bracket 12 preferably has a substantially uniform width between side edges 13*b* and 13*c*, 14*a* and 14*b*, and 16*b* and 16*c* of approximately three inches (3"). Further, the center of hole 18*a* is approximately one and one-half inches ($1\frac{1}{2}$") from edges 13*b* and 13*c*. The center of hole 21 and the center of pin 20 are approximately one and one-half inches ($1\frac{1}{2}$") from edges 16*b* and 16*c*. Bracket 12 preferably has a vertical height from the bottom of plate portion 16 to the top of plate portion 13 of approximately three and one-half inches ($3\frac{1}{2}$"). Bracket 12 preferably has a horizontal length from edge 13*a* to edge 16*a* of approximately ten and three-fourths inches ($10\frac{3}{4}$"). The horizontal length from edge 16*a* to the surface of plate portion 14 facing edge 16*a* is approximately five and three-fourths inches ($5\frac{3}{4}$"). The distance D is preferably five and one-eighths inches ($5\frac{1}{8}$"). The center of hole 18*a* is approximately one and five-eighths inches ($1\frac{5}{8}$") from edge 13*a* and the center of hole 21 is approximately one and five-eighths inches ($1\frac{5}{8}$") from the surface of plate portion 14 facing hole 21. The centers of the other holes 18 are also approximately one and five-eighths inches ($1\frac{5}{8}$") from edge 13*a*. The centers of the outer holes 18 are approximately three-fourths inch ($\frac{3}{4}$") from the center of hole 18*a*. Holes 18, including hole 18*a*, have a diameter of approximately three-eighths inch ($\frac{3}{8}$") and the diameter of hole 21 is approximately one-half inch ($\frac{1}{2}$").

Referring to FIG. 2, it is to be understood that bracket 30 preferably has a length between edges 31*a* and 33*a* and edges 31*b* and 33*b* of approximately seventeen inches (17"). Further, plate portion 32 preferably has a width between edge 32*a* and the intersection of plate portion 32 with plate portion 34 of approximately three inches (3"). Plate portion 34 preferably has a width between edge 34*a* and the intersection of plate portion 34 with plate portion 32 of approximately three inches (3").

Figure 10:
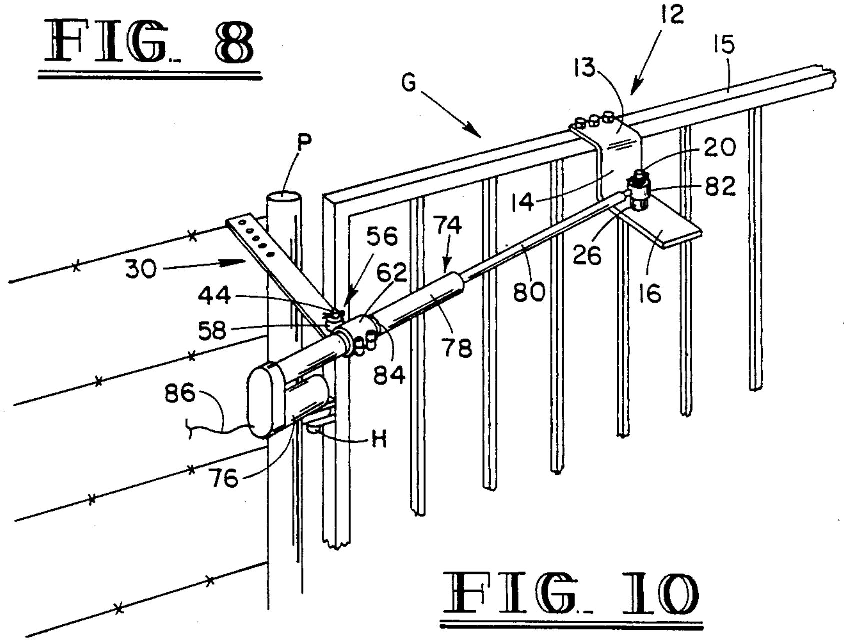
FIG. 10 is a perspective view illustrating an alternate method for mounting the gate opener actuator.

It is to be understood that FIG. 4, FIG. 8, and FIG. 10 are illustrations viewed from the "inside" of gate G with hinge pin H on the left side of gate G as viewed from the "inside" of gate G. Further, actuator 74 will always be mounted on the hinge side of gate G. However, the apparatus and method of the present invention may also be utilized in the event hinge pin H is on the right side of gate G as viewed from the "inside" of gate G such that gate G is hingedly connected to gate post $P_1$ and hinge pin H is intermediate to gate G and post $P_1$. In such event, the same method and apparatus as described hereinabove would be utilized to mount the gate opener apparatus except that bracket 30 would be turned ninety (90) degrees and would be attached to gate post $P_1$. That is, collar 50 is positioned about pin 38 and secured thereto by a set screw 52. Further, once actuator 74 is pivoted to its predetermined position relative to hinge pin H, thereby determining the proper position or location of bracket 30 and pin 38, and actuator 74 is temporarily secured in its predetermined position, pin 38 is inserted through the passage 83 in bearing 81 until bearing 81 rests atop collar 50. The forward end of actuator 74 may thereafter be secured to pin 38 by inserting the straight side of key 48 through one of the passages 40 above bearing 81. Plate portion 34 is thereafter welded to post $P_1$ or bolted to post $P_1$ by inserting bolts (not shown) through passages 42 and connecting the bolts to $P_1$ in a conventional manner. Angle 85 and C-clamp 87 are thereafter removed from bracket 12. Accordingly, bracket 30 may be considered a "universal" bracket in that bracket 30 can be utilized on post P or post $P_1$ on either side of gate G.

Referring to FIG. 10, it is also to be understood that, regardless of which side of gate G hinge pin H is on, either end of actuator 74 may be pivotally mounted or connected to bracket 12 with the opposite end of actuator 74 pivotally mounted or connected to bracket 30. That is, once brackets 12 and 30 have been properly connected to gate G and post P (or $P_1$), respectively, the rearward end of actuator 74 (having band clamp 56 connected thereto) and the forward end of actuator 74 may be removed from pins 20 and 44 (or 38), respectively. Band clamp 56 is thereafter loosened, rotated about actuator barrel 78 one hundred eighty (180) degrees, and retightened. The rearward end of actuator 74 is thereafter pivotally mounted or connected to bracket 30 by placing band clamp 56 over pin 44 (or 38) so that pin 44 (or 38) passes through the passage within bearing 60 and bearing 60 rests atop collar 50. Key 48 may thereafter be inserted through one of the passages 46 (or 40) above bearing 60. The forward end of actuator 74 is thereafter pivotally mounted or connected to bracket 12 by placing eye bolt 82 over pin 20 so that pin 20 passes through the passage 83 within bearing 81 and bearing 81 rests atop collar 26. Key 24 may thereafter be inserted through one of the passages 22 above bearing 81. Accordingly, either end of actuator 74 may be pivotally mounted or connected to bracket 12 or bracket 30. It is also to be understood that locking keys 24 and 48 must be removed from pins 20 and 44 (or 38), respectively, prior to the removal of the rearward end of actuator 74 and the forward end of actuator 74 from pins 20 and 44 (or 38), respectively.

It is to be understood that the apparatus of the present invention may also be sold as a kit comprising bracket 12 and bracket 30. Further, collars 26 and 50 and keys 24 and 48 may also be included as part of the kit. An actuator 74 having a spacer 84 connected thereto at an appropriate horizontal distance $D_2$ and a band clamp 56 may also be included as part of the kit. An angle 85 and C-clamp 87 may also be included as part of the kit. Finally, a power system 88 and remote hand held radio transmitter unit may also be included as part of the kit.

It is to be understood that, in the event the actuator stroke, D, or $D_2$ are different than that recited herein, the $D_1$ and $D_3$ for a desired degree of opening $\theta$ will be calculated or determined prior to the mounting of the actuator 74. This can be done by selecting a distance $D_1$ and thereafter determining the distance $D_3$ which provides the desired degree of opening of gate G. It is also to be understood that the gate G should be able to open to the desired degree $\theta$ prior to the mounting of the actuator 74. Further, it is to be understood that the gate G may be manually opened once the actuator 74 is mounted by removing key 48 from pin 44 (or 38) and removing the actuator 74 from bracket 30.

It is to be understood that, although C-clamp 87 may be a conventional C-clamp and angle 85 may be a separate piece from C-clamp 87, angle 85 may also be welded or otherwise connected to C-clamp 87. Spacer 84 is preferably PVC plastic and preferably has a thickness of approximately one-sixteenth inch (1/16"). Further, it is to be understood that bracket 12 may be secured to gate G in the selected position for bracket 12 by an appropriate clamp (not shown) and welded or bolted to gate G in the selected position for bracket 12 after the positioning of bracket 30. It is also to be understood that a battery (not shown) and a fuse (not shown) may be installed in the power unit 88 after motor 76 is connected to battery pack 89 by cord 86. Finally, it is to be understood that a washer (not shown) may be positioned about each bolt 70 intermediate each nut 72 and each of the bushings 68.

While the method and apparatus for mounting a linear actuator gate opener has been described in connection with the preferred embodiment, it is not intended to limit the invention to the particular form set forth, but rather, it is intended to cover such alternatives, modifications, and equivalents as may be included within the spirit and scope of the invention as defined by the appended claims.

I claim:

1. A method for mounting a linear actuator to a fence and gate, comprising the steps of:
- selectively positioning a first bracket so that said first bracket is at a predetermined distance relative to a hinge member intermediate to said gate and said fence;
- securing said first bracket to said gate in said selected position;
- pivotally mounting a first end of said linear actuator to said first bracket;
- pivoting said linear actuator to a predetermined position wherein said linear actuator is at a predetermined distance relative to said hinge member, thereby determining the proper position of a second bracket;
- temporarily securing said linear actuator in said predetermined position with a temporary securement;
- mounting a second end of said linear actuator to said second bracket;
- securing said second bracket to said fence; and
- removing said temporary securement of said linear actuator.

2. A method for mounting a linear actuator, as recited in claim 1, wherein said step of pivotally mounting a first end of said linear actuator to said first bracket comprises the steps of securing said linear actuator to a band clamp and pivotally mounting said band clamp to said first bracket.

3. A method for mounting a linear actuator, as recited in claim 2, wherein said step of pivotally mounting said band clamp to said first bracket comprises the steps of inserting a first pin connected to said first bracket through a passage in said band clamp and said step of mounting a second end of said linear actuator to said second bracket comprises the step of inserting a second pin connected to said second bracket through a passage in said linear actuator.

4. A method for mounting a linear actuator to a fence and gate, comprising the steps of:
- selectively positioning a first bracket so that said first bracket is at a predetermined distance relative to a hinge member intermediate to said gate and said fence and a lower portion of said first bracket is substantially perpendicular to gate;
- securing said first bracket to said gate in said selected position;
- pivotally mounting a first end of said linear actuator to said first bracket;
- pivoting said linear actuator to a predetermined position wherein said linear actuator is at a predetermined distance relative to said hinge member, thereby determining the proper position of a second bracket;
- temporarily securing said linear actuator in said predetermined position, wherein said step of temporarily securing said linear actuator in said predetermined position comprises the step of securing an angle iron to said first bracket;
- pivotally mounting a second end of said linear actuator to said second bracket; and
- securing said second bracket to said fence.

5. A method for mounting a linear actuator to a fence and gate, comprising the steps of:
- selectively positioning a first bracket so that said first bracket is at a predetermined distance relative to a hinge member intermediate to said gate and said fence and a lower portion of said first bracket is substantially perpendicular to said gate;
- securing said first bracket to said gate in said selected position;
- pivotally mounting a first end of said linear actuator to said first bracket;
- pivoting said linear actuator to a predetermined position wherein said linear actuator is at a predetermined distance relative to said hinge member, thereby determining the proper position of a second bracket;
- temporarily securing said linear actuator in said predetermined position, wherein said step of temporarily securing said linear actuator in said predetermined position comprises the step of securing an angle iron to said first bracket;
- pivotally mounting a second end of said linear actuator to said second bracket;
- securing said second bracket to said fence; and
- removing said angle iron from said first bracket after said step of securing said second bracket to said fence.

6. A method for mounting gate opening apparatus to a fence and gate, comprising the steps of:
- selectively positioning a first bracket so that said first bracket is at a predetermined distance relative to a hinge member intermediate to said gate and said fence, a hole in an upper portion of said first bracket is aligned with the center said gate, and a lower portion of said first bracket is substantially perpendicular to said gate;
- securing said first bracket to said gate at said selected position;
- pivotally mounting a first end of a linear actuator to said first bracket;
- pivoting said linear actuator to a predetermined position wherein said linear actuator is at a predetermined distance relative to said hinge member, thereby determining the proper position of a second bracket;

temporarily securing said linear actuator in said predetermined position with temporary securement;

mounting a second end of said linear actuator to said second bracket;

securing said second bracket to said fence;

removing said temporary securement of said linear actuator;

securing a power system to said gate; and connecting said linear actuator to said power system.

* * * * *